(12) United States Patent
Ottesen et al.

(10) Patent No.: US 6,288,856 B1
(45) Date of Patent: Sep. 11, 2001

(54) REAL-TIME HEAD-TO-DISK CLEARANCE MEASURING METHOD AND APPARATUS

(75) Inventors: Hal Hjalmar Ottesen; Gordon James Smith, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/320,330

(22) Filed: May 26, 1999

(51) Int. Cl.$^7$ .................................................... G11B 27/36
(52) U.S. Cl. ........................ 360/31; 360/75; 360/78.14; 360/65
(58) Field of Search .................. 369/53, 55; 324/212, 324/226, 210; 360/31, 75, 78, 14, 77.08, 234, 230, 65, 46

(56) References Cited

U.S. PATENT DOCUMENTS

| 5,410,439 | * | 4/1995 | Egbert et al. | 360/75 |
| 5,831,781 | * | 11/1998 | Okamura | 360/31 |
| 5,886,844 | * | 3/1999 | Shimizu | 360/65 |

* cited by examiner

*Primary Examiner*—Alan T. Faber
(74) *Attorney, Agent, or Firm*—Mark A. Hollingsworth

(57) ABSTRACT

A method and apparatus for detecting changes in clearance between a read/write transducer and a data storage medium involves acquiring a readback signal from the data storage medium using the transducer, the readback signal comprising one or more isolated pulses, and detecting a change in spacing defined between the transducer and the data storage medium using a slope of an edge of one or more of the isolated pulses.

36 Claims, 10 Drawing Sheets

US 6,288,856 B1

REAL-TIME HEAD-TO-DISK CLEARANCE MEASURING METHOD AND APPARATUS

FIELD OF THE INVENTION

The present invention relates generally to data storage systems and, more particularly, to a system and method for estimating head-to-disk clearance in real-time during data storage system operation.

BACKGROUND OF THE INVENTION

A typical data storage system includes a magnetic medium for storing data in magnetic form and a transducer used to write and read magnetic data respectively to and from the medium. A typical disk storage device, for example, includes one or more data storage disks coaxially mounted on a hub of a spindle motor. The spindle motor rotates the disks at speeds typically on the order of several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more transducers and slider bodies being mounted on flexible suspensions. The slider body lifts the transducer head off the surface of the disk as the rate of spindle motor rotation increases, and causes the head to hover above the disk on an air bearing produced by high speed disk rotation. The distance between the head and the disk surface, which is typically on the order of 40–100 nanometers (nm), is commonly referred to as head-to-disk clearance or spacing.

Within the data storage system manufacturing industry, much attention is presently being focused on reducing head-to-disk clearance as part of the effort to increase the storage capacity of data storage disks. It is generally desirable to reduce the head-to-disk clearance in order to increase the readback signal sensitivity of the transducer to typically weaker magnetic transitions associated with the higher recording density written on disks. When decreasing the transducer-to-disk clearance, however, the probability of detrimental contact between the sensitive transducer and an obstruction on the disk surface significantly increases.

In the continuing effort to minimize head-to-disk clearance, manufacturers of disk drive systems recognize the importance of establishing a nominal head flyheight that is sufficient to avoid disk surface defects, such as protruding asperities. As head-to-disk clearances are reduced to achieve additional improvements in disk drive performance, detecting changes in head-to-disk clearance becomes increasingly important. Unexpected changes in head-to-disk clearance of a particular head, which may or may not result in deleterious head-to-disk contact, are generally indicative of a problem with the particular head or head assembly. By way of example, an appreciable decrease in head-to-disk clearance may be indicative of a suspect head.

A number of screening approaches have been developed for use during disk drive manufacturing to identify heads that are flying with insufficient head-to-disk clearance. One such method for determining head-to-disk clearance is referred to as a Harmonic Ratio Flyheight (HRF) clearance test. Although the HRF clearance test provides accurate head-to-disk spacing measurements, the HRF testing approach typically requires employment of a dedicated tester which may take several minutes to complete HRF testing of a disk drive. Moreover, a HRF testing procedure, even if implemented in-situ a disk drive system, must be performed during idle periods or periods during which user data is neither transferred to nor obtained from the disk.

Other head flyheight evaluation techniques require dedicated tracks of information over which each of the heads must pass in order to obtain head flyheight measurements. Accordingly, such evaluation approaches, like the HRF testing approach, must be performed during idle periods in which information is not being transferred between the head and disk. Using dedicated tracks of information to evaluate head flyheight thus reduces the number of tracks available for storing data, and requires an allotment of time, such as 50 milliseconds (ms) to 100 ms, to perform a flyheight determination procedure for each head.

There exists a need in the data storage system manufacturing community for an apparatus and method for detecting low flying heads during disk drive manufacturing and, importantly, during subsequent use in the field. There exists a further need for an apparatus and method for detecting head-to-disk clearance changes in real time, and without the need for dedicated test tracks. There exists yet a further need to provide such an apparatus and method which is suitable for incorporation into existing data storage systems, as well as into new system designs, and one that operates fully autonomously in-situ a data storage system. The present invention is directed to these and other needs.

SUMMARY OF THE INVENTION

The present invention is directed to an apparatus and method for detecting changes in clearance between a read/write transducer and a data storage medium. A readback signal is acquired from the data storage medium using the transducer. A change in spacing between the transducer and the data storage medium is detected using the readback signal. The spacing and changes in spacing may be detected and quantified in real time.

Detecting the spacing change involves using a readback signal obtained from a location on the data storage medium at which magnetic information is stored, such as a data sector or a servo sector of the data storage medium. The magnetic information from which the spacing and/or spacing change is detected may be obtained from a Gray code portion of a servo sector, such as from an isolated di-bit. Alternatively, the magnetic information may be a pre-written isolated pulse situated at one or more selected locations on the data storage medium. An isolated pulse represents a pulse that is substantially free of inter-symbol interference and filter dynamics.

In one embodiment, detecting the spacing change further involves using a slope of an edge of an isolated pulse, such as the leading edge. A readback signal comprising one or more isolated pulses, such as one or more di-bit responses, is digitized and differentiated. Maximum differentiated leading edge values of the respective isolated pulses are determined and then averaged from which transducer-to-medium spacing or spacing change is computed.

Generally, an average of several maximum differentiated leading edge values obtained from a number of isolated pulses are compared to preestablished slope/head-to-medium spacing data typically established at manufacturing time in order to determine transducer flyheight. For example, the maximums of several differentiated leading edges of isolated pulses within one or more Gray code zones may be averaged and used in the slope/head-to-medium spacing computation.

Spacing data obtained for a particular transducer may be compared to spacing data of other transducers within a common system in order to identify poor performing heads. A large deviation in spacing for a particular head relative to the spacing of other heads is generally indicative of a suspect head. Spacing deviations of approximately two to three sigma or more of the spacing deviation distribution are generally of concern. Such deviations may warrant further evaluation of a suspect head, and notification of the identified suspect head to a host system.

In accordance with another embodiment, detecting the spacing change for particular transducer involves using a pulse width of one or more isolated pulses obtained from a magnetic data storage medium. The width of the leading edge of each isolated pulse is estimated when the respective isolated pulses reach a preestablished amplitude, such as 50% of peak amplitude. The preestablished amplitude may range between approximately 10% and 70% of isolated signal peak amplitude. It is noted that smaller amplitude thresholds yield greater sensitivity. Head-to-disk spacing is determined using an average of the pulse width estimates for a particular transducer, such as by comparing the average pulse width value to preestablished pulse width/head-to-medium spacing data typically developed at system build time.

In accordance with yet another embodiment, a portion of an isolated pulse, such as a leading portion of a di-bit, may be integrated to produce an area value corresponding to the area of the leading pulse portion. A number of integrated pulse area values may be computed and averaged. A change in the average pulse area values of one head relative to other heads of a common system may be indicative of a suspect head.

In accordance with a further embodiment of the present invention, inverse filtering of the isolated pulses is provided prior to converting the pulses from analog form to digital form. Inverse filtering effectively neutralizes undesirable alterations to the shape of an isolated pulse which typically occurs during upstream highpass filtering of the isolated pulses.

Use of inverse filtering in accordance with this embodiment advantageously provides the opportunity to use the trailing edge of an isolated pulse in connection with a maximum slope technique for detecting head-to-disk spacing changes. In addition, the trailing portion of an isolated pulse or the entire pulse (e.g., positive and negative going portions of a di-bit) may be used in connection with an integration technique for detecting changes in head-to-disk spacing. Still further, inverse filtering of an isolated pulse permits the entire pulse width to be used for purposes of detecting head-to-disk spacing changes using a pulse width technique.

An apparatus for detecting changes in a spacing dimension defined between a transducer and a data storage medium includes an analog-to-digital converter (ADC). The ADC converts an analog readback signal obtained from the data storage medium to a corresponding digitized readback signal. In one embodiment, a digital filter is configured to differentiate the digitized readback signal, which typically comprises a series of isolated pulses. The filter is a linear filter, such as a finite impulse response (FIR) filter. The digital filter is preferably configured as a linear phase discrete-time differentiator. A digital inverse filter may be coupled between the ADC and digital filter (e.g., FIR filter) for purposes of neutralizing undesirable alterations in isolated pulse shape due to highpass filtering dynamics.

While processing information transferred between the transducer and the data storage medium, a processor, such as a servo processor, disk drive controller, or other signal processing device of the data storage system, computes the flyheight of each of the transducers using either the differentiated edge slope, area portion or pulse width of several isolated pulses. The processor that performs the transducer flyheight computation may be the same processor that coordinates the transfer of data between the transducer and the data storage medium or, alternatively, a different processor, such as a servo processor.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
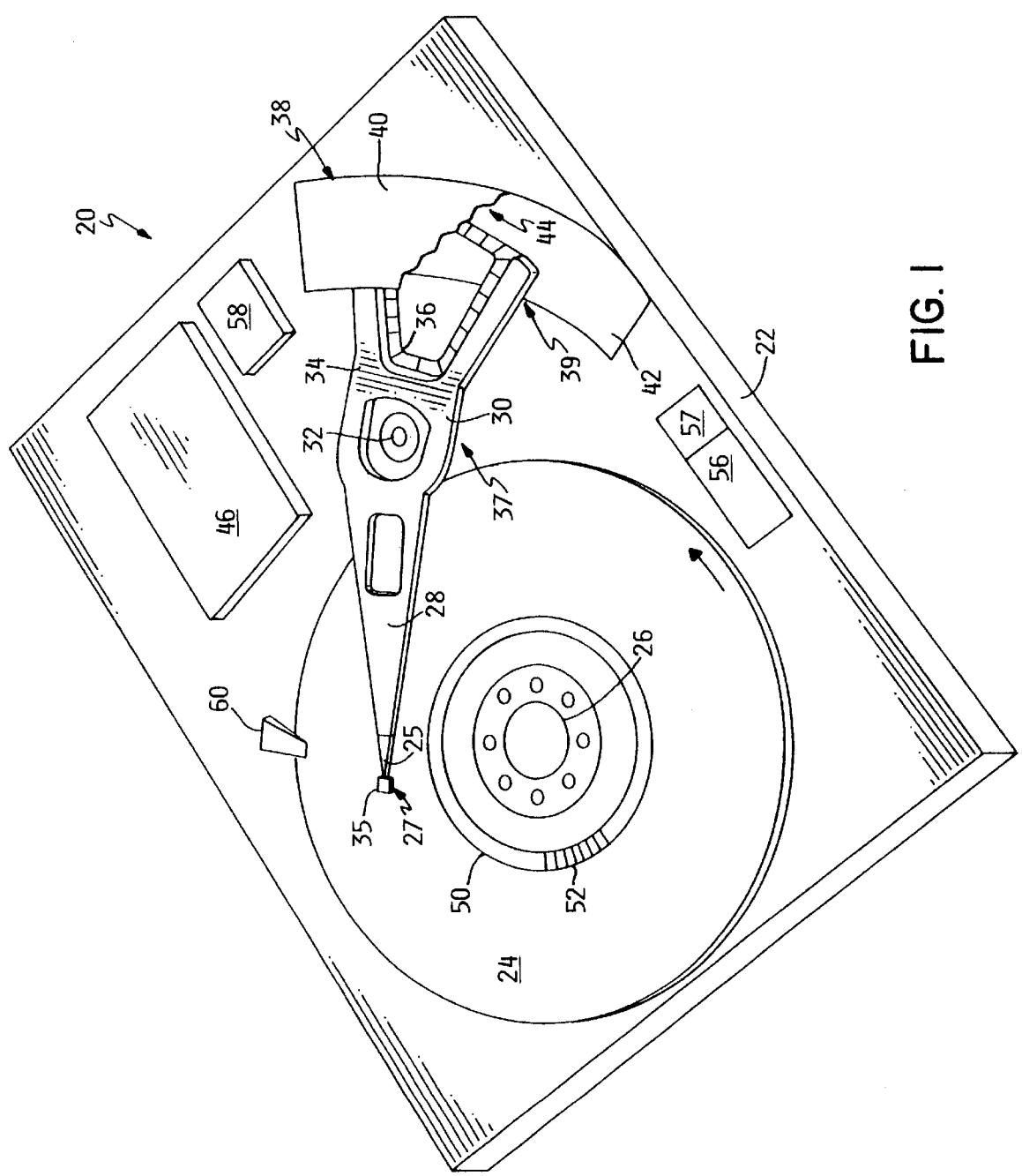
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Figure 2:
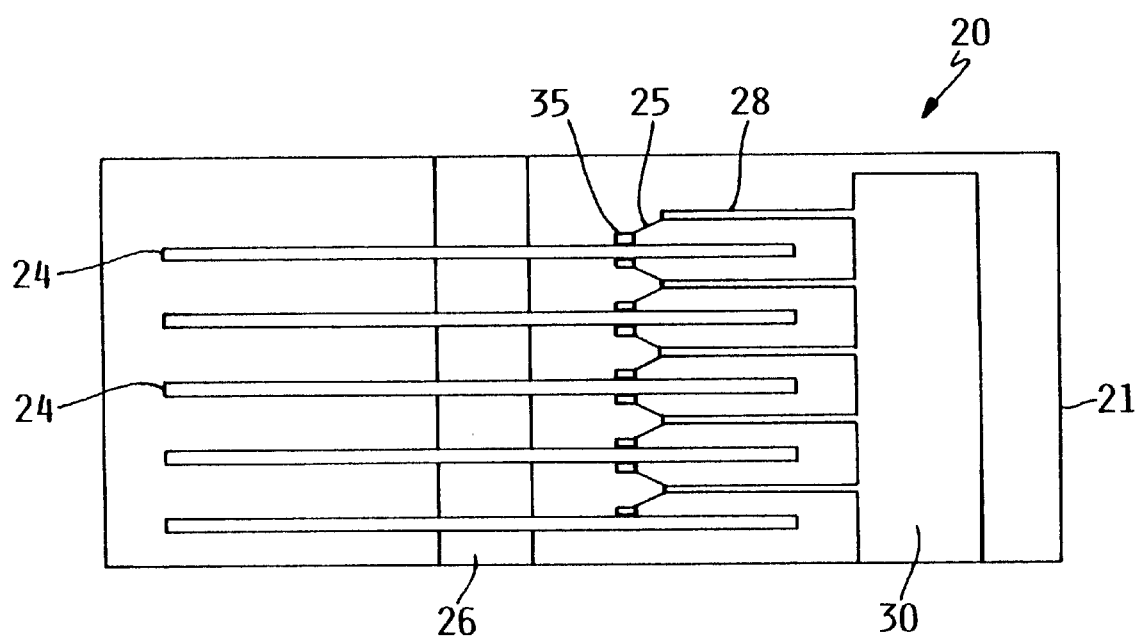
FIG. 2 is a side plan view of a disk drive system comprising a plurality of data storage disks.

Referring to the drawings, and more particularly to FIGS. 1 and 2, there is illustrated a data storage system 20 within which a real-time, head-to-disk clearance measuring methodology of the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, with each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an airbearing produced by high speed rotation of the disk 24. The distance between the slider 35 and the disk surface 24, which is typically on the order of 40–100 nanometers (nm), is commonly referred to as head-to-disk clearance or spacing.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted as two separate devices in FIG. 1, it is understood that the functionality of the servo processor 56 and disk drive controller 58 may be embodied in a single multi-purpose processor, which typically results in a reduced component cost.

Figure 3:
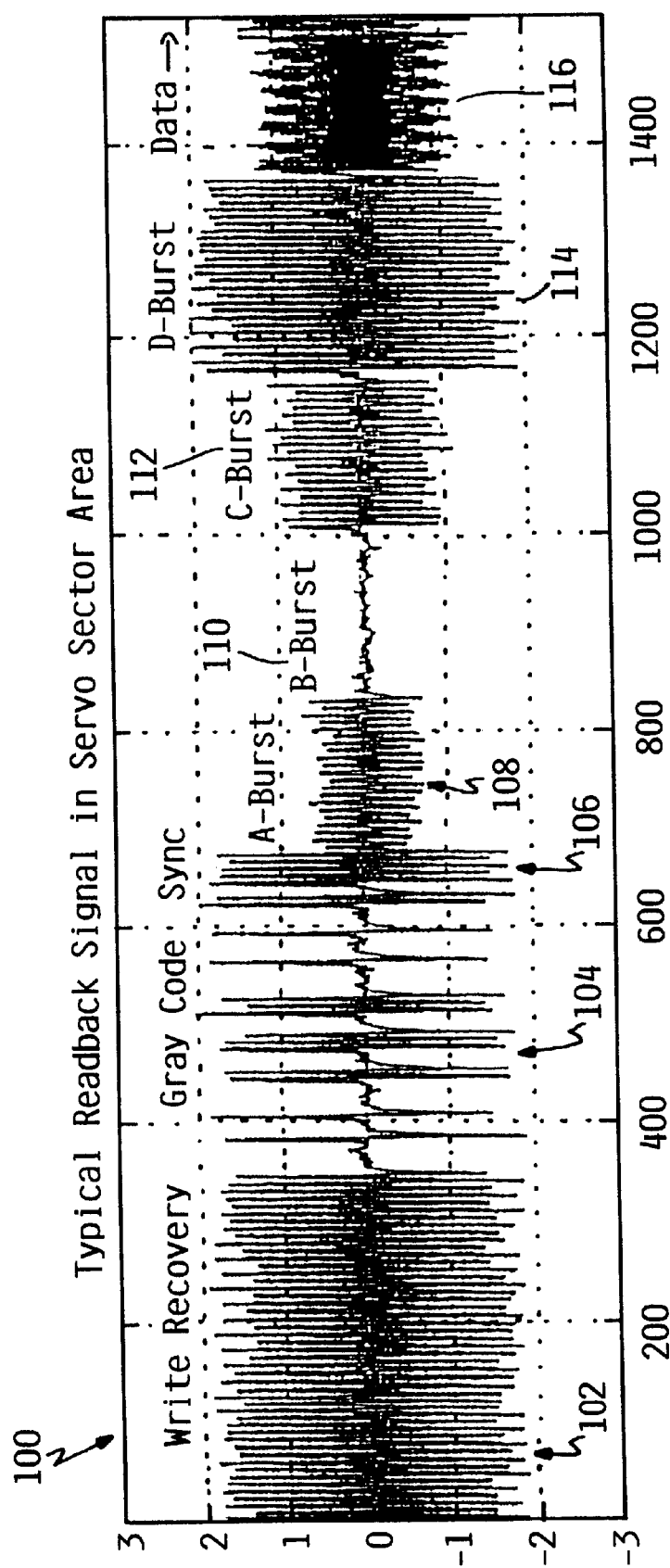
FIG. 3 is a representation of a typical magnetic readback signal obtained from a pre-written servo sector of a data storage disk.

Turning now to FIG. 3, there is shown a waveform 100 representing a typical magnetic readback signal obtained from a pre-written servo sector of a data storage disk. As will be discussed in detail hereinbelow, an apparatus and method in accordance with an embodiment of the present invention advantageously exploits certain information that is pre-written in the servo sector as a basis for detecting changes in head-to-disk clearance.

It will be understood, however, that magnetic information or transitions provided at locations other than a servo sector of the disk may be used to detect and measure head-to-disk spacing and spacing changes according to the present invention. For example, one or more isolated pulses located anywhere on the disk surface may be used. Such isolated pulses are substantially free of inter-symbol interference and filter dynamics. If pre-processing of a readback signal results in an appreciable alteration in the shape of the isolated pulses, such as by use of a preamplifier exhibiting high pass filtering behavior, then only the leading edge of the pulses should be used. However, as will be discussed in greater detail hereinbelow, inverse filtering of isolated pulses subjected to upstream highpass filtering provides the opportunity to use the trailing edge of the isolated pulses as well.

Figure 4:
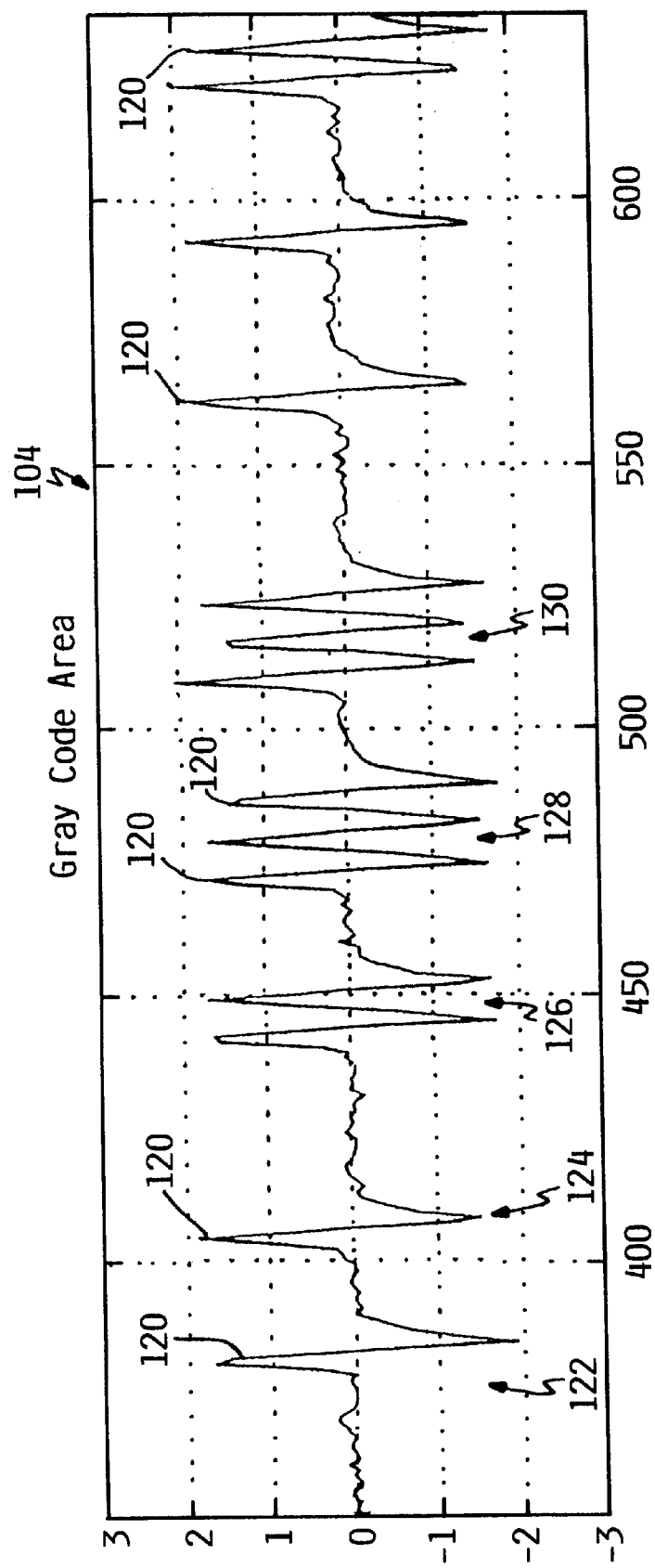
FIG. 4 is a more detailed representation of a Gray code field of a servo sector which includes a number of di-bit magnetic transitions.

A typical servo sector, such as that depicted in FIG. 3, includes a write recovery field 102, a Gray code field 104, and a synchronization or sync field 106. Other fields include A-, B-, C-, and D-burst fields 108, 110, 112, and 114, respectively, and a small portion of a data field 116. FIG. 4 is a more detailed showing of the Gray code field 104 depicted in FIG. 3.

FIG. 4 shows that the Gray code field 104 includes a number of positive and negative going transitions 120, referred to as di-bits or di-bit responses, whose leading edges are substantially free of inter-symbol interference and filter dynamics. Di-bits 120 are readily detectable magnetic transitions which are widely used in the industry within the Gray code field 104 for purposes of data track identification. Using pre-written di-bits 120 or other suitable pre-written magnetic transitions wholly eliminates the need for dedicated testing/calibration tracks or other surface features otherwise required to evaluate head flyheight and head-to-disk spacing changes.

In accordance with one embodiment of the present invention, one or more di-bits 120 provided in the Gray code field 104 are used for the dual purposes of facilitating track identification during normal operation and, in addition, facilitating detection of head-to-disk clearance in accordance with the principles of the present invention. Moreover, track identification and head-to-disk clearance detection using di-bits 120 may be performed contemporaneously, although performing such processes in parallel is not required in order to enjoy the benefits and advantages of the present invention.

Still further, the use of di-bits 120 in a Gray code field 104 for purposes of evaluating head flyheight and head-to-disk spacing changes exploits preexisting magnetic transitions which eliminates the need to pre-write dedicated information on the disk which could otherwise be used for storing data or other systemic information. The presence of a di-bit within a timing window is decoded as a binary "1" and the absence of a di-bit within a timing window is decoded as a binary "0." Accordingly, only certain di-bit combinations should be used, such as those separated by one or more binary zeros, in order to prevent inter-symbol interference. Suitable di-bits may be readily identified and their track locations determined for purposes of performing head-to-disk spacing measurements.

As was discussed previously, it is understood that magnetic information or transitions other than di-bits may be used to detect and measure head-to-disk spacing and spacing changes according to the present invention, and that one or more isolated pulses which are substantially free from inter-symbol interference and filter dynamics located anywhere on the disk surface may be used.

Moreover, it will be understood that suitable magnetic transitions need not produce both positive and negative going response pulses. It will be further appreciated that test pulses or other test transitions may be written to the disk at desired locations prior to performing a head-to-disk spacing measurement according to the present invention, rather than using pre-written transitions.

Figure 5:
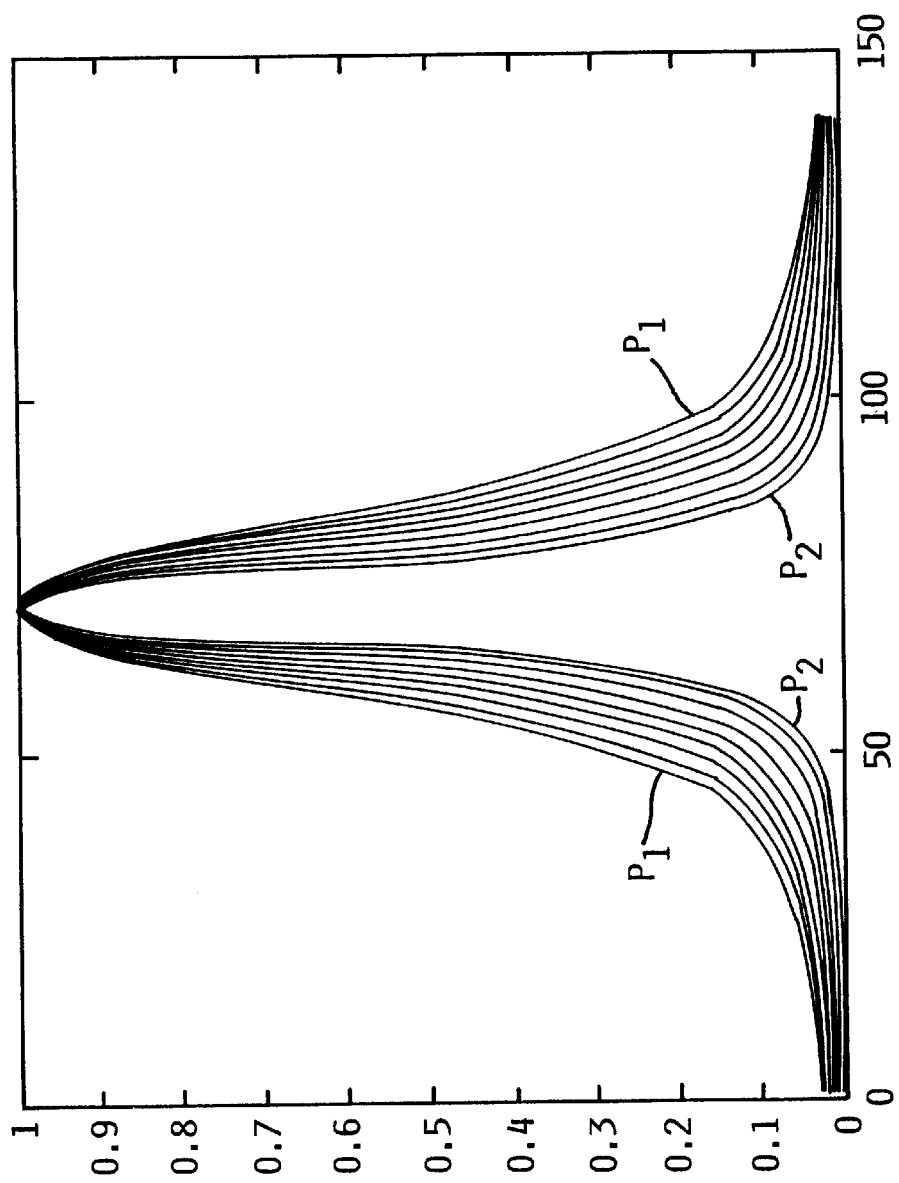
FIG. 5 is an illustration of a family of normalized isolated pulses of a magnetic readback signal, each of which represents a different head-to-disk spacing.

Referring now to FIG. 5, there is illustrated a family of normalized isolated pulses of a magnetic readback signal, each of which represents head-to-disk spacing ranging from approximately 13 nanometers (nm) to approximately 90 nm. It is noted that the normalized isolated pulses shown in FIG. 5 were derived by integrating the well-known Potter magnetoresistive (MR) head equation and using typical head and disk parameters associated with current drive operation.

The narrower pulses shown in FIG. 5 are representative of a smaller head-to-disk spacing (e.g., 13 nm), while the wider pulses indicate a larger head-to-disk spacing (e.g., 90 nm). It can be seen that the leading and trailing edges of the wider pulses, such as pulse $P_1$, have slopes that are more gradual (i.e., not as steep) than those of the narrower pulses, such as pulse $P_2$.

It has been determined by the inventors that the slope of an isolated waveform of a magnetic readback signal, such as an isolated pulse or a di-bit response for example, may be associated with head-to-disk spacing. More particularly, the maximum slope of a leading edge of an isolated waveform derived from a magnetic readback signal may be used to quantify head-to-disk spacing and to detect changes in such spacing.

Figure 6:
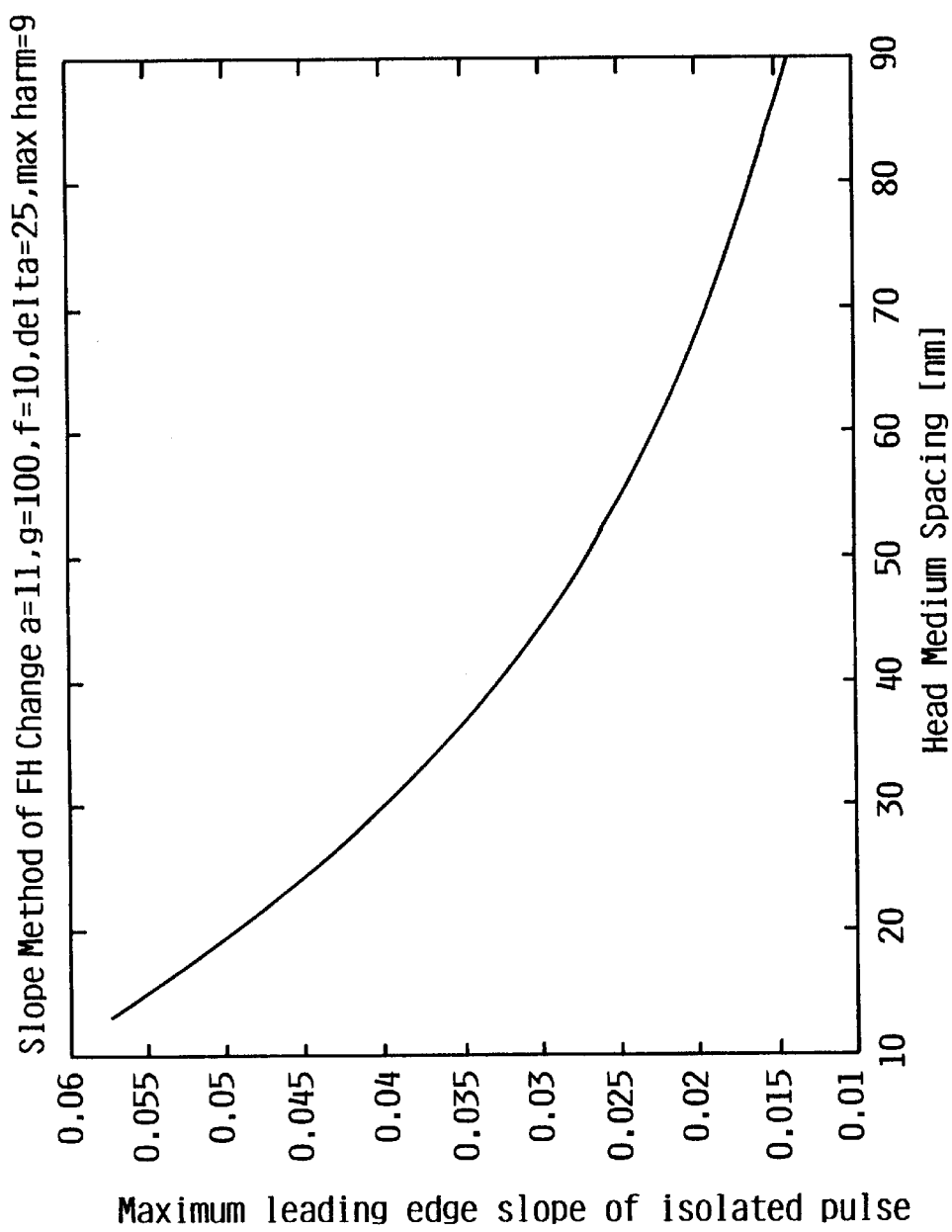
FIG. 6 graphically illustrates the relationship between head-to-disk spacing, measured in nanometers, and maximum leading edge slope of an isolated pulse in accordance with the principles of the present invention.

FIG. 6 is a plot of head-to-medium (e.g., disk) spacing, measured in nanometers, as a function of maximum leading edge slope of an isolated magnetic readback signal pulse. It has been found that, over the expected range of flying heights, the maximum slope technique of the present invention provides for a dynamic range of approximately 5:1 (e.g., flyheight variations of 15 nm to 75 nm).

It has been further determined that the head-to-disk measuring methodology of the present invention provides for a sensitivity to head flying height changes that is at least 5 percent greater than that associated with a conventional flyheight estimation approach. The head-to-disk measuring methodology of the present invention advantageously provides for head-to-disk spacing measurements in real-time by analyzing the slope of an isolated pulse while contemporaneously performing normal information transferring and/or processing operations. Using a head-to-disk clearance estimation approach according to the present invention eliminates the need for such dedicated tracks.

Figure 7:
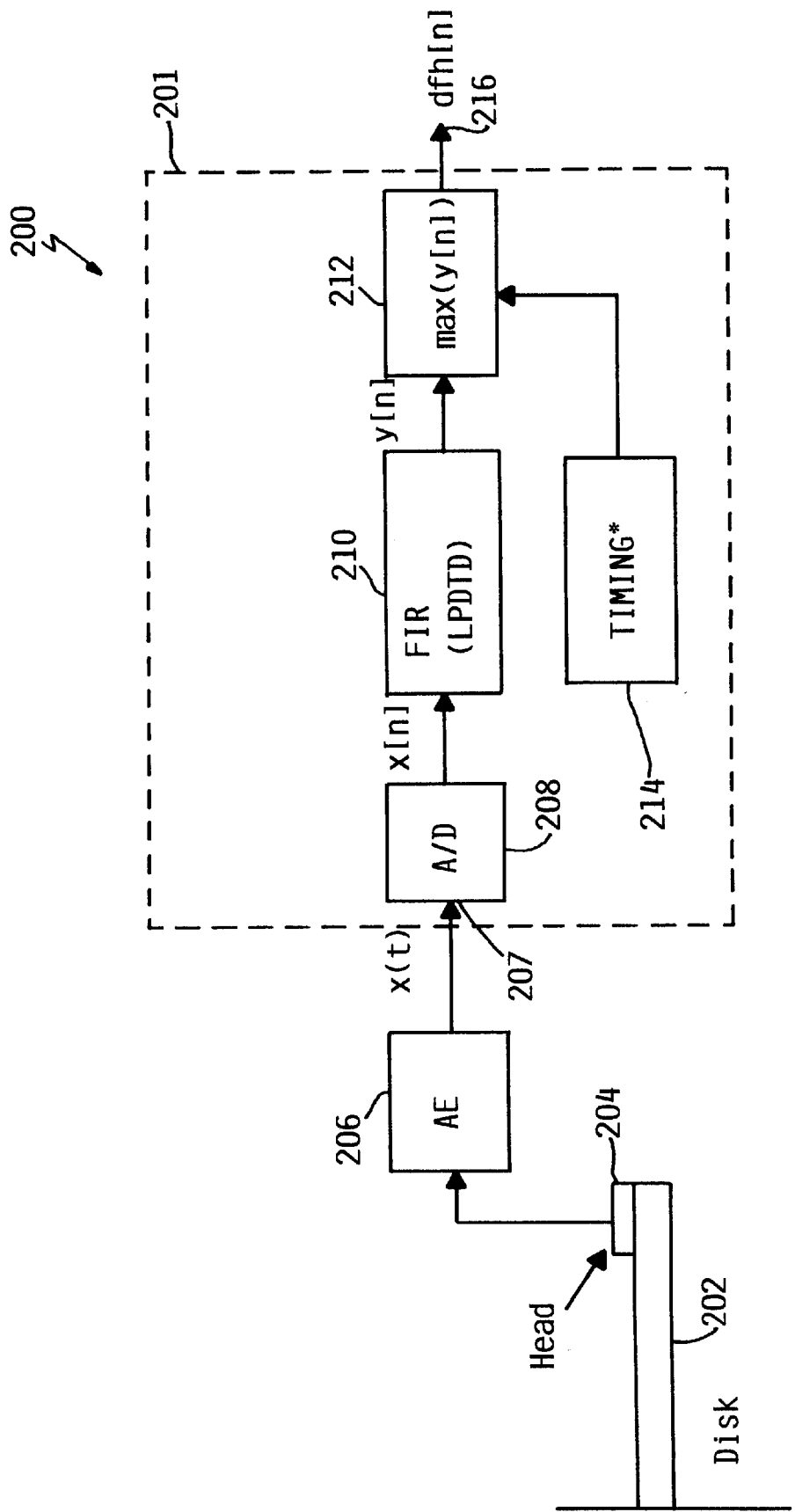
FIG. 7 is a block diagram of signal processing circuitry provided in a data storage system or other signal processing system for estimating head-to-disk spacing using the slope of the leading edge of an isolated pulse in accordance with the principles of the present invention.

In one embodiment of the present invention, and as illustrated in FIG. 7, estimating head-to-disk spacing using the slope of an edge of an isolate pulse is facilitated through use of signal processing circuitry 201 provided in a data storage system or other signal processing system 200. In a data storage system application, the signal processing circuitry 201 may, for example, represent data channel circuitry or servo channel circuitry. Signal processing circuitry 201 includes an analog-to-digital converter (ADC) 208 which converts an analog input signal, x(t), to a corresponding digital output signal, x[n].

The output of ADC 208 is coupled to an input of a digital filter 210. Digital filter 210 preferably exhibits a linear phase response, such that the signal, y[n], developed at the output of digital filter 210 is linearly related to the signal, x[n], applied to the input of digital filter 210. In one particular embodiment, digital filter 210 is a finite impulse response (FIR) filter. In a preferred embodiment, digital filter 210 is a FIR filter configured to operate as a linear phase discrete-time differentiator (LPDTD) to estimate the average slope of the isolated di-bit.

The output of digital filter 210 is coupled to a computation device 212. A timing device 214 is coupled to computation device 212 and may provide a timing window for the slope computation. Computation device 212 receives the signal, y[n], developed at the output of digital filter 210 and determines the maximum of the derivative of the leading edge of the signal, y[n]. In an embodiment in which digital filter 210 is configured to operate as an LPDTD, computation device 212 determines the maximum slope of the leading edge of the signal, y[n], which corresponds to the maximum of the derivative of the leading edge of an isolated pulse or di-bit response.

Timing unit 214 provides a signal to computation device 212 indicating the occurrence of a leading edge of an isolated pulse or di-bit response. Computation device 212, in response to the timing signal, determines the maximum value of the derivative signal, y[n], during the occurrence of a leading edge of an isolated pulse or di-bit response. It is noted that timing unit 214 may be provided internal or external to the signal processing circuitry 201.

Due to minute local coersivity variations in the magnetic surface coating around a track of interest, such as a track containing di-bits having appropriate properties, and small changes in head-to-disk spacing due to air turbulence, there may be some variation in the maximum value of the derivative signal, y[n]. It is therefore desirable to average the maximum values from several isolated di-bits on one or more tracks. The computation of estimated flyheight is then based on the average of the maximum of the derivative signal, y[n], from the leading edge of the multiple isolated di-bits. The average of the maximum of the derivative signal, y[n], is synonymous with the average maximum slope, S(i), of the leading edges of the isolated di-bits for head i, i=0, 1, . . . , Q−1, where Q is the total number of heads in the disk drive.

A signal, dfh [an], is produced at the output of computation device 212 which corresponds to the maximum value of the derivative signal, y[n], determined during the occurrence of a leading edge of an isolated pulse or di-bit response. It has been determined by the inventors that an average of the signal, dfh[n], produced at the output of computation device 212 is representative of head-to-disk spacing or clearance.

In an embodiment in which preamplification of the readback signal obtained from the disk 202 is performed, such preamplification often involves high pass filtering of the readback signal. By way of example, and with reference to FIG. 7, an arm electronics (AE) module 206 is coupled between head 204 and the input of ADC 208. As an isolated pulse in the readback signal obtained from head 204 is filtered by a highpass filter in AE module 206, the shape of the isolated pulse changes. The filtered isolated pulse provided at the output of AE module 206 is identified in FIG. 7 as the signal x(t).

Figure 9:
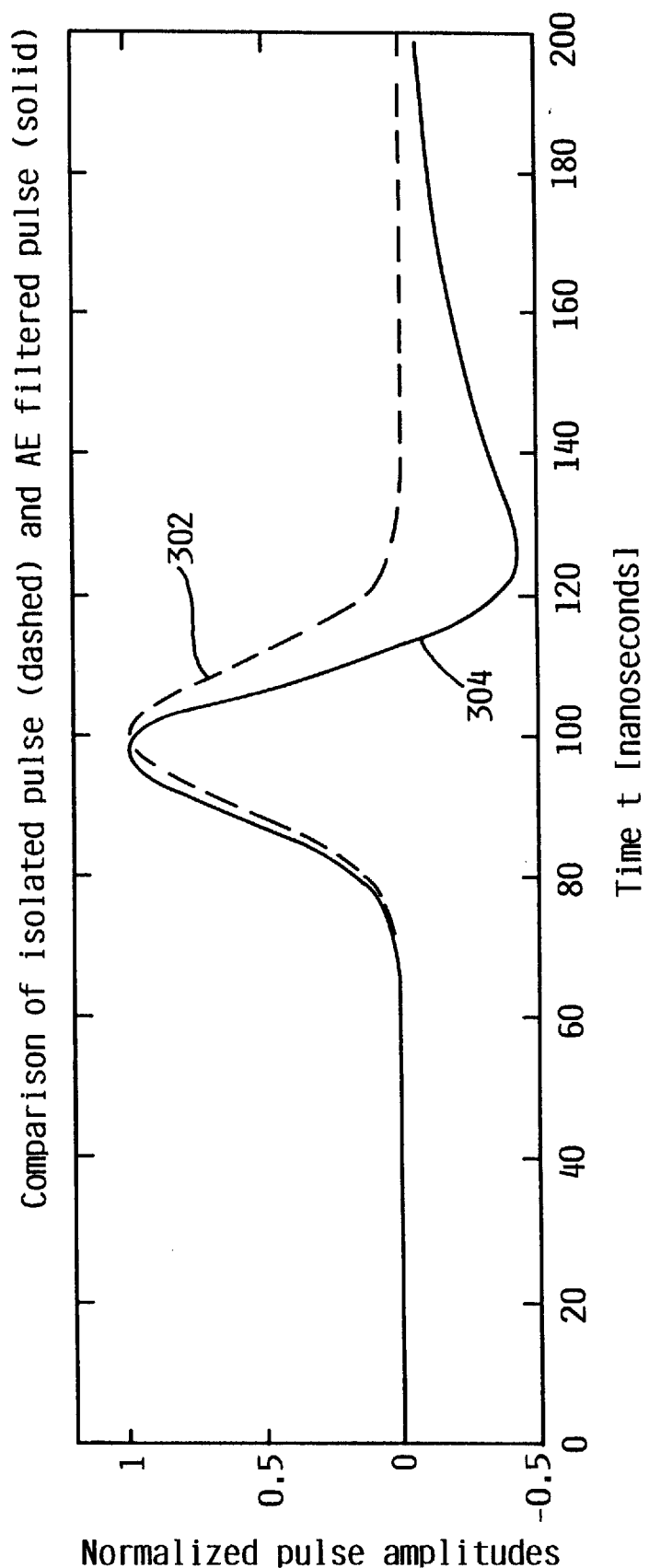
FIG. 9 is a plot of normalized isolated pulse amplitudes as a function of time showing the effects of filtering dynamics on the shape of a highpass filtered isolated pulse.

FIG. 9 illustrates the impact of filter dynamics on the shape of an isolated pulse 302 applied to the input of AE module 206. Normalized unfiltered and filtered isolated pulses are illustrated in FIG. 9 as waveforms 302 and 304, respectively. Waveform 302, shown as a dashed line, depicts an isolated pulse that is highpass filtered by AE module 206. It can be observed that the two waveforms, 302 and 304, are different. However, the leading edge of the unfiltered isolated pulse 302 and the highpass filtered pulse 304 are quite similar.

To achieve an accurate estimate of head-to-disk clearance, it is desirable to use only the leading edge of the filtered isolated pulse 304. The simulation of FIG. 9 shows a Gaussian pulse highpass filtered with a cutoff frequency of 4.5 MHz. By comparing the filtered isolated pulse 304 in FIG. 9 to the family of pulses shown in FIG. 5, it can be appreciated that only the leading edge of a highpass filtered isolated pulse should be used. It is noted that Potter's equation is based on an analysis that assumes symmetric pulses, such as those shown in FIG. 5.

FIG. 6 graphically demonstrates the relationship of head-to-disk spacing, measured in nanometers, to maximum leading edge slope of an isolated pulse. The data from which the curve of FIG. 6 is generated is largely dependent on the properties of a particular head of a data storage system (e.g., transducer geometry, shield geometry and magnetic properties, etc.), with similar curves being developed for other heads of the system. Such data is typically developed at the time of data storage system manufacture and stored in a protected memory location, such a read-only-memory (ROM), flash memory or other non-volatile but typically alterable memory.

The head-to-disk spacing values acquired and stored over a period of time may be used to evaluate subtle and appreciable changes in flyheight of a particular head. For example, a newly derived head-to-disk spacing measurement for a particular head may be compared to an "as-built" spacing measurement for the particular head which was stored in memory at the time of disk drive system manufacturing.

Flyheight changes of a particular head beyond an allowable deviation threshold relative to other heads within the system may be, and often is, indicative of a suspect head or head support assembly. A suspect head signal or message may be transmitted from the disk drive system to a host system for purposes of logging and reporting the existence, identification, and related information concerning the suspect head.

The methods described herein are differential in nature. An absolute flyheight for each head 204 may be determined and stored for future reference at time of manufacture using other known methods. After the disk drive system is introduced into the field, and during normal operation, only the average slope, width or area of the leading edge of the signal x(t) can be computed. For example, the change, dS, in the average slope is an indication of whether a particular head is flying lower or higher than it did at manufacturing time. Computationally, the change, dS, in the average slope of the leading edge of the signal x(t) may be expressed as:

$$dS(i)=[S(i)-SO(i)]/SO(i) \quad [1]$$

where, SO(i) represents the average slope measured at manufacturing time.

If dS(i) is positive (i.e., dS(i)>0), then the head is flying closer to the disk surface than it did at manufacturing time. If, on the other hand, dS(i) is negative (i.e., dS(i)<0), then the head is flying higher relative to the disk surface than it did at manufacturing time. Comparing the difference between the change in average slope, dS(i), i=0, 1, 2, . . . , Q−1 for all Q heads in the disk drive system will reveal a suspect head, i=m, as a large positive outlier in dS(m)>>dS(i), i≠m.

Alternatively or additionally, a newly derived head-to-disk spacing measurement for a particular head may be compared with flyheight measurements of other heads provided in the disk drive system. A head having a head-to-disk spacing appreciably different from that of other heads may be indicative of a suspect head. Preemptive action may be taken to address a problem head well before any actual damage to the head and/to disk surface occurs.

In accordance with an embodiment of the present invention, the process of estimating the leading edge slope of an isolated pulse, such as a di-bit response for example, is facilitated through use of digital filter 210 configured to operate as an LPDTD. In such an embodiment, the infinite impulse response of the LPDTD 210 is given by:

$$h_{diff}[p] = \frac{\pi \cos(\pi p) - \sin(\pi p)}{\pi p} \quad [2]$$

where, p=(n—M/2) and M represents the filter order which is typically an even integer. The length of digital filter 210 is given as N=M+1, and n represents the sampling index which is typically an integer in the range of all negative and positive integers.

Given a particular implementation, a suitable value of M may be 8, which is commensurate with a 9-tap FIR filter. It is noted that a 9-tap FIR filter is provided in the signal processing circuitry of many currently available disk drive systems. If it is assumed that the value of M is 8 in Equation [2] above, the following equation results:

$$h_{diff}[n] = \frac{\cos(\pi n)}{n - 4} \quad [3]$$

It is desirable to truncate the infinite response of LPDTD 210. If the value of M used in Equations [2] and [3] above is 8, then a window length of 9 is appropriate for purpose of truncating the infinite response of LPDTD 210. An appropriate windowing approach includes the use of a 9-point Hamming window which may be represented as:

$$w(n) = (1/50)(27 - 23 \cos(\pi n/4)) \quad [4]$$

Figure 8:
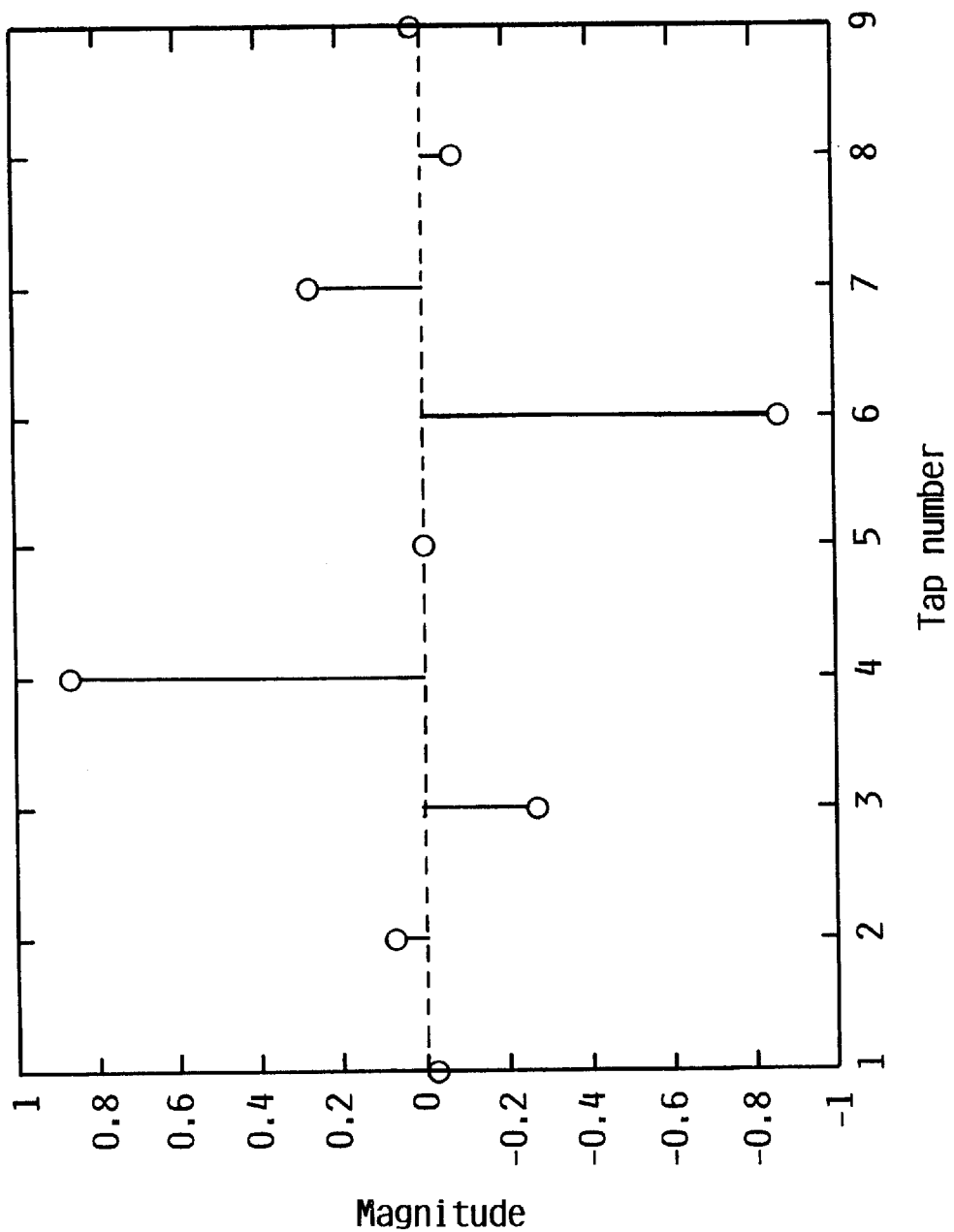
FIG. 8 is a plot of coefficients associated with a digital filter configured to operate as a linear phase discrete-time differentiator in accordance with the principles of the present invention.

The resultant finite impulse response of LPDTD 210 is represented as the inner dot product of the window function represented in Equation [4] (i.e., w(n)) and the infinite impulse response represented in Equation [3] (i.e., $h_{diff}[n]$). A plot of coefficients resulting from a dot product operation that assumes a value of M of 8 in Equation [3] and a window length of 9 in Equation [4] is provided in FIG. 8. The odd symmetry of these coefficients, which represent FIR filter tap values, demonstrates the linear phase characteristics of LPDTD 210.

Referring again to FIG. 7, and in accordance with an embodiment in which signal processing circuitry 201 is provided in a disk drive system 200, the signal, x(t), provided at the input of ADC 208 is produced at the output of an arm electronics (AE) module 206. The AE module 206 receives a readback signal produced by a read/write transducer or head 204 sensing magnetic transitions developed on the surface of a data storage disk 202. Head 204 may comprise a magnetoresistive (MR) read element, a thin-film read element or other type of read element. The readback signal is typically amplified by AE module 206 and may further be filtered by AE module 206.

In an embodiment in which signal processing circuitry 201 is provided in the servo channel of disk drive system 200, the signal, x(t), provided at the input of ADC 208 may represent a di-bit response obtained from the Gray code field of a servo sector, such as di-bit 122 or 124 of Gray code field 104 shown in FIG. 4. In accordance with this embodiment, a number of spaced-apart servo sectors, such as 90 servo sectors for example, are disposed along each track (i.e., embedded servo). As such, 90 servo sectors are available during each revolution of data storage disk 202 for purposes of performing head-to-disk spacing measurements.

Head-to-disk spacing measurements, in accordance with the principles of the present invention and as previously discussed, may be made while information is contemporaneously transferred between the head 204 and data storage disk 202, such as during a time interval between servo samples. The head-to-disk spacing measurements may be computed by the servo processor, disk drive controller or other digital signal processing device or chip.

Head-to-disk spacing and spacing changes may further be determined by analysis of all or a portion of the width of an isolated pulse, such as a di-bit pulse. In accordance with one embodiment, and with reference to FIG. 10, head flyheight may be estimated from the average width of an isolated pulse. A relationship between the 50% pulse width, PW50, and transducer flyheight, d, is given by:

$$d = -K_3 + \sqrt{(PW50^{2-K_1})/K_2} \quad [5]$$

where, $K_1$, $K_2$, and $K_3$ are functions of transducer (e.g., MR stripe) geometry, media thickness, coersivity, etc.

Referring once again to FIG. 7, the digital version of the AE-filtered isolated pulse, x(n), provided at the output of ADC 208 is used for the head-to-disk spacing measurement according to this embodiment. The leading edge of the AE-filtered isolated pulse, x(n), is stored and normalized by dividing the maximum value of x(n). Here, the normalized leading edge sequence becomes xn(n)=x(n)/max(x(n)). Using the normalized sequence xn(n), the index $n_1$ for which $xn(n_1)=0.5$ and the index $n_2$ for which $xn(n_2)=1.0$ can be determined by straightforward means.

Figure 10:
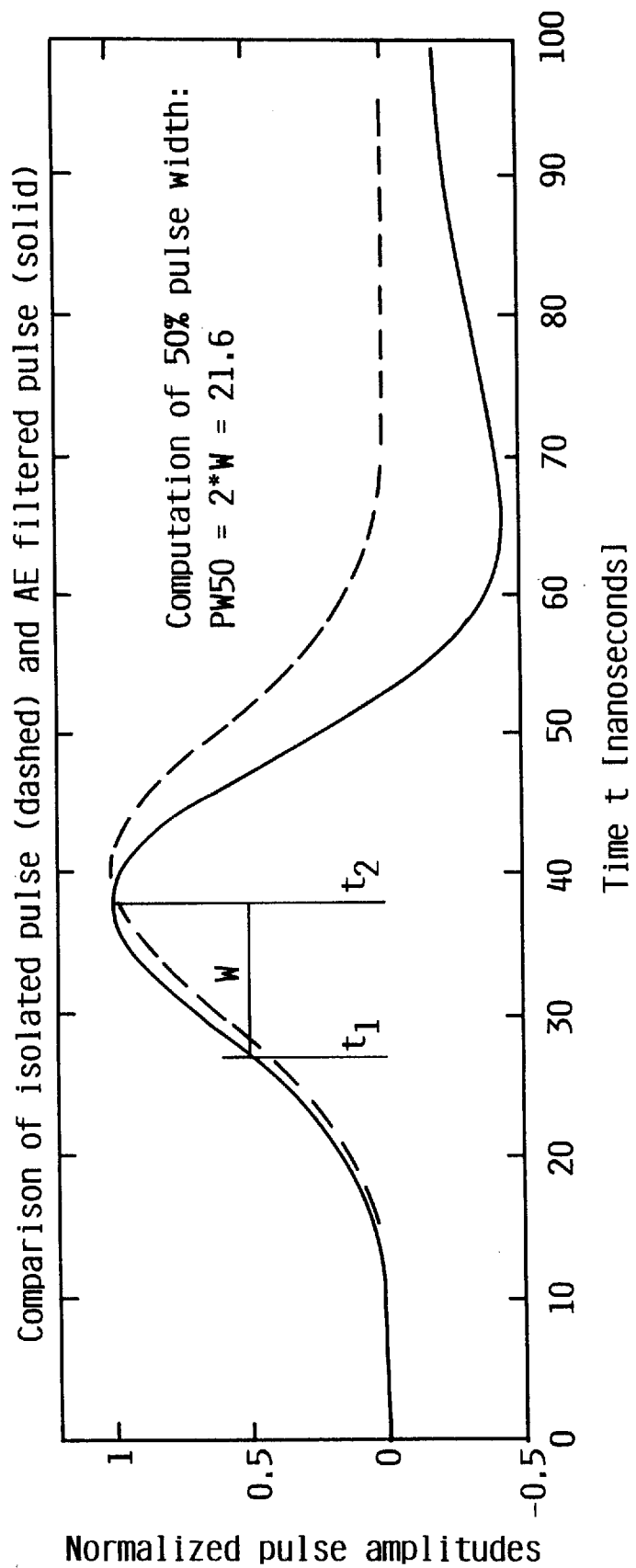
FIG. 10 is a plot of normalized isolated pulse amplitudes as a function of time useful in describing a head-to-disk spacing estimation approach in accordance with another embodiment of the present invention.

If the sampling rate is given as $f_s$ (Hz), then the corresponding index times become $t_1=n_1/f_s$ and $t_2=n_2/f_s$. The times $t_1$ and $t_2$ are indicated in FIG. 10. The 50% pulse width, PW50, is computed using the W term (i.e., $t_2-t_1$), which in this case represents one-half of the pulse width, and may be expressed as:

$$PW50 = 2W = 2(n_2 - n_1)/f_s \quad [6]$$

Computed values of PW50 are averaged for several isolated pulse widths over one or more sectors and used as the PW50 value in Equation 5 above from which a change in head-to-disk spacing, d, may be computed. It is assumed that appropriate spacing data recorded at manufacturing time is stored for reference. It will be appreciated that the percentage of the pulse width used in connection with the above-described pulse width technique may be varied, and that the analysis using 50% of the pulse width is provided for illustrative purposes only.

In addition to the slope and pulse width techniques discussed above, an integration technique may be employed in accordance with another embodiment of the present invention for detecting head-to-disk spacing changes. A leading portion of an isolated pulse, such as a di-bit, may be integrated to produce an area value that corresponds to the area of the leading pulse portion. By way of example, the leading edge portion of the pulse may extend to the peak of the pulse, in which case the computed area value is multiplied by two to provide an estimation of the area of the entire pulse. A number of integrated pulse area values may be computed and averaged. A change in the average pulse area values of one head relative to other heads of a common system may be indicative of a suspect head.

In accordance with another embodiment of the present invention, inverse filtering of the isolated pulses is provided prior to converting the pulses from analog form to digital form. According to this embodiment, an inverse filter may be coupled between the output of AE module 206 and the input of ADC 208 shown in FIG. 7. Inverse filtering effectively neutralizes undesirable alterations to the shape of an isolated pulse, which is most pronounced along the trailing edge (see, e.g., FIGS. 9 and 10).

Use of an inverse filter in accordance with this embodiment advantageously provides the opportunity to analyze the trailing edge of an isolated pulse in connection with the maximum slope technique discussed above. In addition, the trailing portion of an isolated pulse or the entire pulse (e.g., positive and negative going portions of a di-bit) may be used in connection with the integration technique discussed previously. Still further, inverse filtering of an isolated pulse permits the entire pulse width to be used for purposes of detecting head-to-disk spacing changes using the pulse width techniques described above.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of detecting changes in clearance between a read/write transducer and a data storage medium, the method comprising:

acquiring a readback signal from the data storage medium using the transducer, the readback signal comprising one or more isolated pulses obtained from one or more Gray code locations of the data storage medium; and detecting a change in spacing defined between the transducer and the data storage medium using an area, a width or a slope of an edge of one or more of the isolated pulses.

2. The method of claim 1, wherein the isolated pulses are obtained from Gray code fields of one or more servo sectors provided on the data storage medium.

3. The method of claim 1, wherein the isolated pulses comprise di-bit responses.

4. The method of claim 1, further comprising:

differentiating the isolated pulses; and determining a maximum value of an edge of each of the isolated pulses;

wherein detecting the spacing change further comprises detecting the spacing change using an average of the maximum values of the respective edges.

5. The method of claim 4, wherein the edge of each of the isolated pulses is a leading edge.

6. The method of claim 4, wherein the edge of each of the isolated pulses is a trailing edge.

7. The method of claim 1, further comprising inverse filtering the isolated pulses.

8. The method of claim 1, wherein detecting the spacing change using an area of the isolated pulses further comprises integrating at least a portion of the isolated pulses.

9. The method of claim 1, further comprising comparing the detected spacing change with a preestablished flyheight value associated with the transducer.

10. The method of claim 1, further comprising comparing the detected spacing change associated with a particular transducer with a spacing change associated with one or more other transducers.

11. The method of claim 1, wherein detecting the spacing change using the width of each of the isolated pulses comprises determining a duration of time for the isolated pulse to reach a preestablished amplitude and multiplying the time duration by a factor corresponding to the inverse of a ratio of the preestablished amplitude to a peak amplitude of the isolated pulse.

12. The method of claim 11, wherein the preestablished amplitude ranges between approximately 10 percent and 70 percent of a peak amplitude.

13. The method of claim 1, wherein detecting the spacing change further comprises detecting the spacing change in real time.

14. An apparatus for detecting changes in a spacing defined between a transducer and a data storage medium, comprising:

an analog-to-digital converter (ADC), the ADC converting an analog readback signal obtained from the data storage medium using the transducer to a corresponding digitized readback signal, the readback signal comprising one or more isolated pulses obtained from one or more Gray code locations of the data storage medium;

a digital filter configured to filter the digitized isolated pulses; and a processor that computes the spacing change using an area, a width or a slope of an edge of one or more of the filtered isolated pulses.

15. The apparatus of claim 14, further comprising a second processor, wherein the second processor computes the spacing change in real time.

16. The apparatus of claim 14, wherein the digital filter is a linear phase digital filter.

17. The apparatus of claim 14, wherein the digital filter is configured as a linear phase discrete-time differentiator.

18. The apparatus of claim 14, wherein the digital filter comprises a finite impulse response (FIR) filter.

19. The apparatus of claim 14, wherein the isolated pulses are obtained from Gray code fields of one or more servo sectors provided on the data storage medium.

20. The apparatus of claim 14, wherein the isolated pulses comprise di-bit responses obtained from one or more Gray code fields of the data storage medium.

21. The apparatus of claim 14, wherein the processor determines a maximum value of an edge of each of the filtered isolated pulses, and computes the spacing change using an average of the maximum values of the respective edges.

22. The apparatus of claim 14, further comprising a digital inverse filter coupled between the ADC and digital filter.

23. The apparatus of claim 22, wherein the digital filter integrates all or a portion of the isolated pulses, and the processor estimates an area of the isolated pulses using all or the portion of the integrated isolated pulses.

24. The apparatus of claim 14, wherein the processor compares a spacing change associated with a particular transducer with a spacing change associated with one or more other transducers.

25. The apparatus of claim 14, wherein the processor estimates the width of each of the filtered isolated pulses by determining a duration of time for the filtered isolated pulses to reach a preestablished amplitude and multiplying the time duration by a factor corresponding to the inverse of a ratio of the preestablished amplitude to a peak amplitude of the filtered isolated pulses.

26. A data storing system, comprising:

a data storage disk;

a plurality of transducers each supported by a support structure in proximity with the disk;

an actuator that provides relative movement between the transducers and the disk, a spacing defined between the transducers and the data storage disk;

an analog-to-digital converter (ADC), the ADC converting an analog readback signal obtained from the data storage disk using a selected one of the transducers to a corresponding digitized readback signal, the readback signal comprising one or more isolated pulses obtained from one or more Gray code locations of the data storage medium;

a digital filter configured to differentiate the digitized isolated pulses; and a processor that computes the spacing change associated with each of the transducers using an area, a width or a slope of an edge of one or more of the isolated pulses.

27. The system of claim 26, wherein the digital filter is a linear phase digital filter.

28. The system of claim 26, wherein the digital filter is configured as a linear phase discrete-time differentiator.

29. The system of claim 26, wherein the processor compares a spacing change associated with a particular transducer with a spacing change associated with one or more other transducers.

30. A method of detecting changes in clearance between a read/write transducer and a data storage medium, the method comprising:

acquiring a readback signal from the data storage medium using the transducer, the readback signal comprising one or more isolated pulses; and detecting a change in spacing defined between the transducer and the data storage medium using a slope of an edge of one or more of the isolated pulses.

31. The method of claim 30, wherein the isolated pulses are obtained from Gray code fields of one or more servo sectors provided on the data storage medium.

32. The method of claim 30, wherein the isolated pulses comprise di-bit responses.

33. The method of claim 30, further comprising:

differentiating the isolated pulses; and determining a maximum value of an edge of each of the isolated pulses;

wherein detecting the spacing change further comprises detecting the spacing change using an average of the maximum values of the respective edges.

34. The method of claim 30, wherein the edge of each of the isolated pulses is a leading edge.

35. The method of claim 30, wherein the edge of each of the isolated pulses is a trailing edge.

36. The method of claim 30, wherein detecting the spacing change further comprises detecting the spacing change in real time.

* * * * *